Oct. 21, 1969     J. D. COTNEY     3,473,676

WORKPIECE TRANSFER DEVICE

Filed April 17, 1967     2 Sheets-Sheet 1

INVENTOR.
James D. Cotney
BY
Charles R. White
ATTORNEY

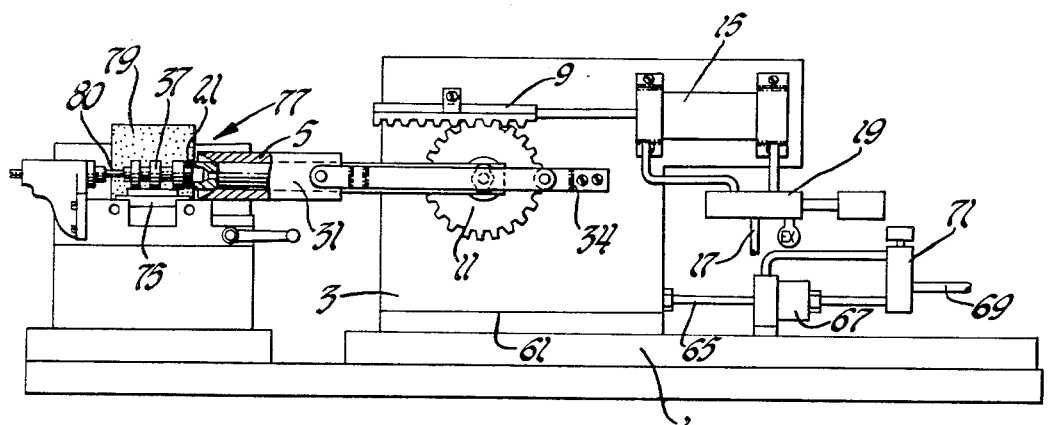
Fig. 2
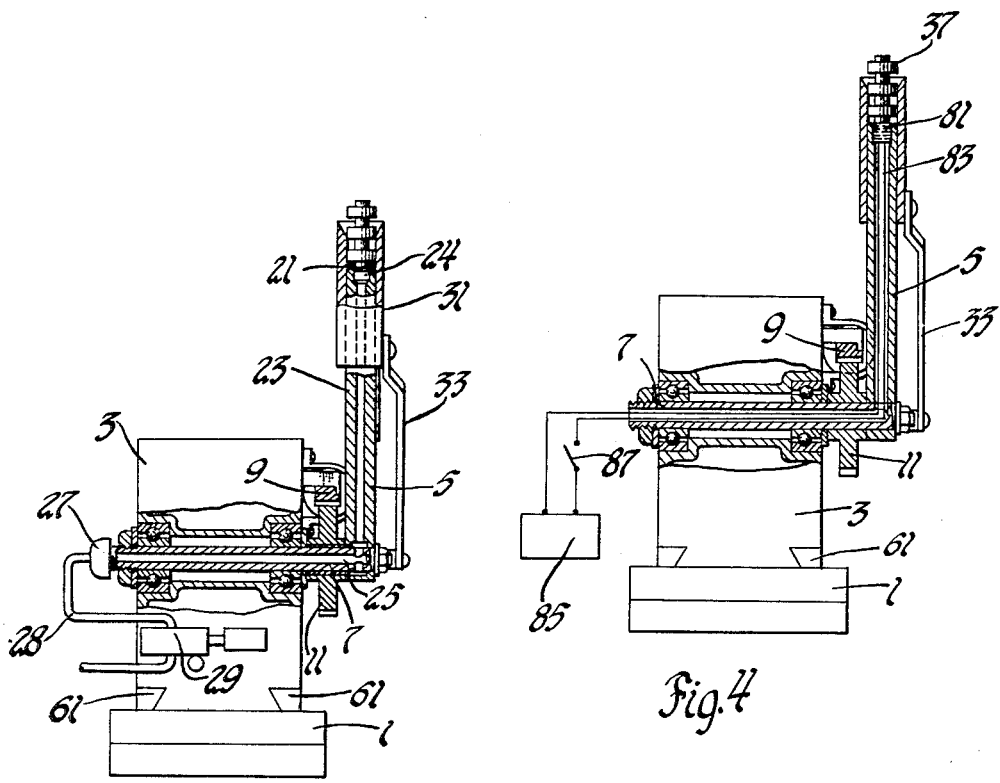
Fig. 3
Fig. 4
INVENTOR.
James D. Cotney
BY Charles R. White
ATTORNEY United States Patent Office 3,473,676
Patented Oct. 21, 1969

3,473,676
WORKPIECE TRANSFER DEVICE
James D. Cotney, Westland, Mich., assignor to General Motors Corporation, Detroit, Mich., a corporation of Delaware
Filed Apr. 17, 1967, Ser. No. 631,439
Int. Cl. B65h *5/08;* B65g *59/04*
U.S. Cl. 214—8.5                                11 Claims

ABSTRACT OF THE DISCLOSURE

A workpiece transfer device having a transfer arm pivoted to a slidable support. The arm has a slidably mounted locating sleeve with an end portion which extends beyond the free end of the arm when in loading position to guide each workpiece supplied by a loading station onto a seat formed in the free end of the arm. The transfer arm has a passage leading from a vacuum source controlled by a valve to the workpiece seat. The valve is operated to open the passage to the vacuum source so that the workpiece is securely retained to the arm by atmospheric pressure. A sleeve operating linkage slides the sleeve inwardly on the transfer arm as the arm is turned by an actuator to position the workpiece in the unloading station without sleeve interference after which the passage is opened to atmospheric pressure to release the workpiece from the arm.

---

This invention relates to workpiece loaders for transferring workpieces from a loading station to an unloading station and particularly to a loader having a pivoted transfer arm which seats and holds the workpiece being transferred by the establishment of a vacuum in a line leading to the seated workpiece or by the establishment of a magnetic field.

Prior to the present invention, workpieces were usually loaded into machines such as centerless grinders by gravity feed loaders, or by loaders having a pivoted transfer arm with valve gripping jaws at the end thereof. The latter mentioned loaders were the most efficient since they securely hold the piece being loaded and accurately placed it in the grinder against a limit stop. However, the use of gripping jaw type loaders was limited to loading only pieces having extended projections which could be gripped and which were not to be ground.

The present invention is a highly efficient and accurate loader which can transfer a wide variety of workpieces, including valves having lands at their ends or having extending stems. In a preferred embodiment of the invention the workpiece being transferred is retained in the end of a pivoted transfer arm by atmospheric pressure and the establishment of a vacuum in a line in the arm which leads to the workpiece seated in the arm. In another embodiment of the invention, magnetic force is used to hold the valve to the end of the arm. In both embodiments when the transfer arm is in a workpiece receiving or loading position, a guide sleeve is extended so that its end portion extends beyond the end of the loading arm to provide a guide for directing the workpiece exiting from a loading station into the end of the arm. This sleeve is retracted by a linkage mechanism as the arm is turned to the unloading position so that the workpiece may be placed in a machine such as the throat of a centerless grinder fully ready for grinding operation.

It is an object of this invention to provide a workpiece loader having a transfer arm movable between loading and unloading stations with an improved construction with no moving parts in the arm for holding the workpiece by its end to the outer extremity of the transfer arm.

Another object of this invention is to provide a workpiece loader having a workpiece guide sleeve movably mounted on a transfer member which has an end portion that extends beyond the end of the transfer member when the member is in a position to receive the workpiece and which automatically retracts on the transfer member as it is moved to an unloading position so that the workpiece can be accurately positioned in a receiving station without guide sleeve interference.

Another object of this invention is to provide a new and improved workpiece loader having a movable transfer arm in which there is a passage opening to a workpiece seat formed in its outer end which may be evacuated when the workpiece is on the seat so that atmospheric pressure will hold the workpiece on the arm as it is being transferred to an unloading station.

Another object of this invention is to provide a new and improved workpiece loader having a transfer member with a magnetic device at its outer end for holding a metallic workpiece while being transferred to an unloading station.

Another object of this invention is to provide a new and improved method of transferring workpieces from a supply station to an unloading station.

These and other objects of the invention will become more apparent from the following detailed description and drawings in which—

FIG. 2 is a view similar to FIG. 1 illustrating unloading operation.

FIGURE 3 is a view taken along lines 3—3 of FIG. 1.

FIGURE 4 is a diagrammatical view similar to that of FIG. 3 showing a portion of another embodiment of the invention.

Figure 1:
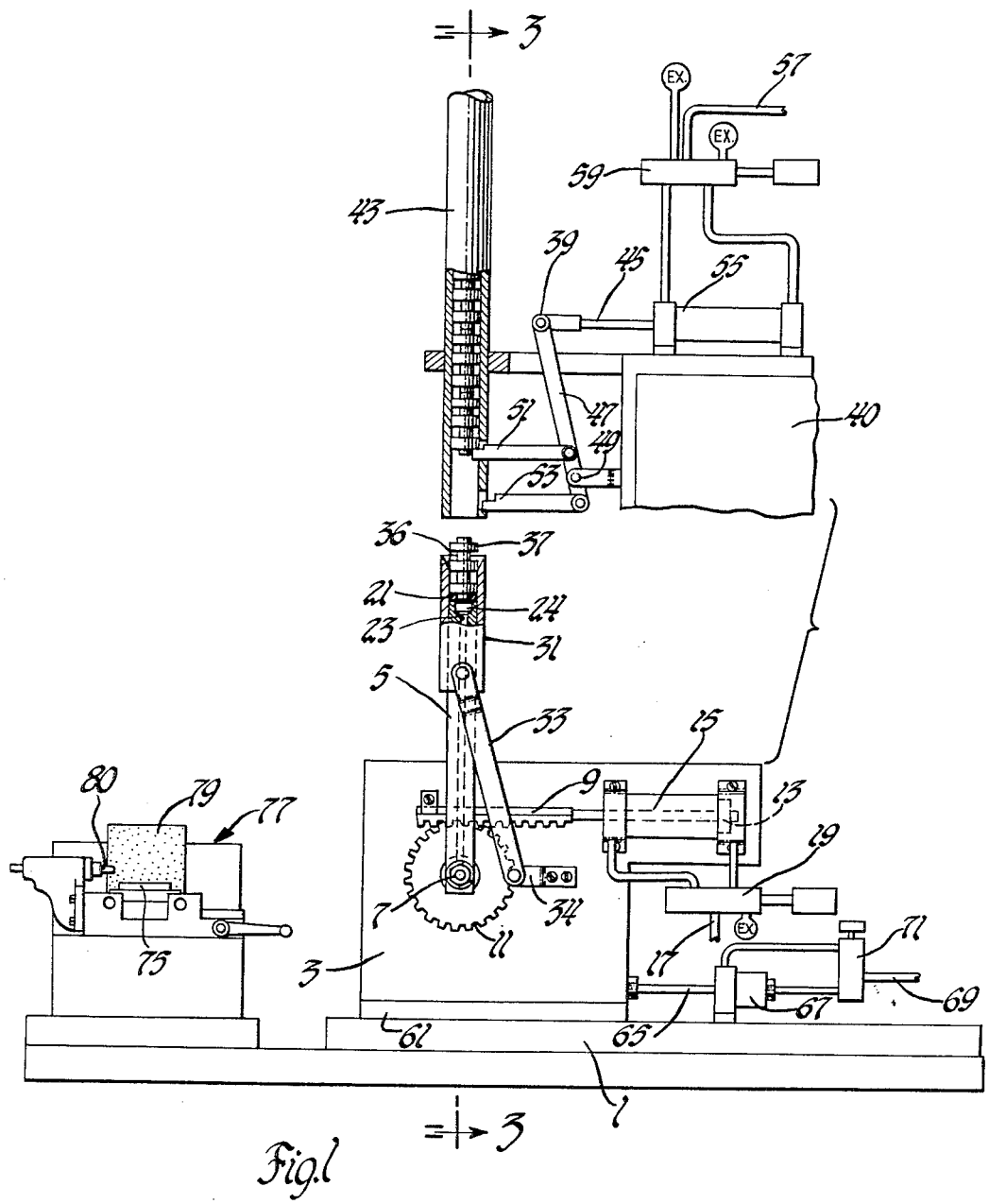
FIG. 1 is a diagrammatical side view of a preferred embodiment of the invention illustrating loading operation.

Turning now to the drawings, the loader includes a base 1 on which slidable carriage or support 3 is mounted. The carriage carries a cylindrical transfer arm 5 that is rigidly connected at one end to a rotatable shaft 7 which pivotally mounts the arm to the carriage. This arm is movable between an upright loading position shown in FIG. 1 and a horizontal unloading position shown in FIG. 2 by an actuator mechanism which includes rack 9 and pinion 11. The pinion is splined to the pivot shaft 7 and meshes with the rack which is fastened to a double-acting piston 13 reciprocally mounted within a cylinder 15 that is secured to carriage 3. The cylinder is connected to a source of fluid pressure by lines 17 and a control valve 19 arranged so that fluid pressure may be admitted to either side of the piston to advance or retract the piston and the attached rack. The control valve 19 is operated manually or by other suitable means.

The transfer arm illustrated partly in section in the drawings has an upper end which carries an O-ring seal 21 of elastomeric material which may be affixed thereto by an adhesive or by other suitable retaining means. The arm 5 has a central bore 23 which leads into an enlarged recess 24 that opens at the outer end of the arm which holds the seal 21. The bore 23 communicates with a central bore 25 formed in pivot shaft 7. As illustrated by FIG. 3, this shaft has one end which extends from the support onto which fitting 27 is secured. The fitting accommodates a line 28 leading from a vacuum source through a control valve 29.

A cylindrical guiding sleeve 31 is slidably mounted on the arm 5 and is positioned thereon by a link member 33 which has one end pivoted to the sleeve and the other end pivoted to a bracket 34 fixed on the carriage 3 and which extends outwardly therefrom. As shown, this latter pivot is laterally offset from the pivot axis of the transfer arm 5. When the arm is in the upright position, the sleeve is extended by the link member 33, so that the end portion of the sleeve extends above the end of the transfer arm 5. This end portion is tapered at 36 to guide the workpiece 37 having cylindrical lands to be ground onto the end of the arm as it is dropped from an escapement device 39 secured to a support 40 which may be fixed to base 1. A supply tube 43 is also secured to support 40 into which a plurality of workpieces have been loaded. The escapement device includes a double-acting piston 45 that actuates the escapement linkage including an operating link 47 pivotally fastened at one end to the piston and by pivot 49 to the support 40. As shown in FIG. 1, the escapement device further includes a pair of arm members 51 and 53 pivotally secured to the operating link on either side of the pivot 49 which extend into the supply tube 43.

The piston 45 is mounted in a cylinder 55 which is connected to a source of fluid pressure by lines 57 and a control valve 59. This valve can be controlled manually or otherwise to selectively admit pressure to either side of the piston to extend one of the escapement arms into the tube while retracting the other to trap and feed the workpieces one at a time into the sleeve 35 and then to the end of the arm 5.

The carriage 3 is slidably mounted on runners 61 secured to the base 1 and is moved with respect to the base by a double-acting piston 65 which is mounted in a cylinder 67 that is connected to a source of fluid pressure by lines 69 and a control valve 71.

FIGURE 1 illustrates the loader in the start position with the arm 5 upright aligned with the supply tube 43. The sleeve on the arm 5 is extended so that its end portion projects beyond the end of the arm to guide workpieces as they are fed from the tube 43. In this position the carriage 3 has been retracted by operation of the piston 65.

To feed a workpiece from the supply tube, the valve 59 is actuated to move the piston 45 toward the supply tube which causes the escapement arm member 53 to retract from the tube and release the workpiece trapped between arm members 51 and 53 into the end of arm 5. The other arm member 51 simultaneously extends into the tube to block the other workpieces in supply tube 43.

When the workpiece has been seated on the end of the arm 5, valve 29 is actuated to open the passage 23 to vacuum so that atmospheric pressure will hold the workpiece to the end of the transfer arm.

To position the arm to the unloading position, valve 19 is actuated to cause the piston 13 to move forwardly advancing rack 9 and turning pinion 11 and the attached arm 5 counterclockwise. As the arm turns in this direction, the link 33 operates to retract the sleeve 35 inwardly on the arm 5 to move the outer end of the sleeve away from the end of the transfer arm. Valve 71 is actuated simultaneously with valve 19 to cause the carriage operating piston 65 to move forwardly and to advance the carriage 3.

When the arm is at the horizontal position, the workpiece will be positioned on the rest blade 75 mounted on the grinder 77. The workpiece is positioned on this support between a grinding wheel 79 and a regulating wheel not illustrated and against ejector pin 80 so that the lands can be ground. When the workpiece is in position, the valve 29 controlling the vacuum is actuated to open the passage 23 to atmospheric pressure so that the part will be released on the rest ready for grinding operation. The valve 71 is then actuated so that the carriage operating piston 65 retracts the carriage to clear the arm from the workpiece and prevent workpiece upset. After the carriage has been retracted to the position of FIG. 1, the transfer arm control valve is operated to permit the piston 13 to retract the rack and turn the pinion 11 and the connected transfer arm 5 clockwise to the loading position. When the carriage is fully retracted and the arm is perpendicular, it will again be aligned with the supply tube 43 ready for another workpiece. The limits of travel of the carriage, the transfer arm and the escapement arm members are controlled by piston stroke or by other suitable stop mechanisms.

The embodiment of FIG. 4 is similar in construction and operation to the embodiment of FIGURES 1 through 3, and like parts have been assigned the same reference numerals. The FIG. 4 embodiment varies from that of FIGURES 1 through 3 in the mechanism for securing the workpiece to the transfer arm. As shown in FIG. 4, there is an electromagnet 81 securely fastened to the outer end of the transfer arm which is connected by conductors 83 to a power source 85 controlled by a switch 87. When the arm 5 is in the upright loading position, the switch can be closed and the electromagnet is energized so that it will hold a metallic workpiece 37 of iron, steel or other suitable material to the end of the arm. When the arm 5 is turned to the unloading position, the switch is opened to deenergize the electromagnet and release the valve into the grinder as previously described. The other parts of the device operate as described.

With this invention the means holding the workpiece to the transfer arm can have a diameter smaller than the workpiece to avoid contact with the grinding wheels or other working machinery. Furthermore, the extreme end of the workpiece is held at the outer end of the transfer arm so that the part to be ground can be fully inserted in the grinder with no interference between any part of the transfer arm and the grinder wheels.

Though this workpiece transfer device can be manually controlled, it may be automatically controlled by fluid and/or electric control systems. The control valves are shown with control solenoids for use with a preferred electric control circuit. The electric control circuit may use a starting switch and a plurality of time delay relays and for switches controlled by the position of elements of the device or use a plurality of cam controlled switches and element position controlled switches to actuate the device in the above described cycle.

This invention is not limited to the details of the construction shown and described for purposes of illustrating the invention for obvious modifications will occur to those skilled in the art.

I claim:

1. A transfer device for moving an article from a loading station to an unloading station, a support, a transfer member, means movably securing said transfer member to said support, means operatively connected to said transfer member for moving said transfer member with respect to said support between the loading and unloading station, said transfer member having a seat formed at the outer end thereof to receive and support an article supplied thereto, guide means slidably mounted on said transfer member and having a portion extending beyond said seat when said transfer member is positioned at said loading station to guide an article from said loading station onto said seat, said transfer member further having internal means selectively operable to secure the article on said seat and externally of said transfer member to permit said transfer member to move the article from the loading station, control means for said internal means operable in one condition of operation to effect the selective release of the article from said seat subsequent to movement of said transfer member from the loading station to said unloading station and means operatively connected to said article guide means to slide said guide means on said transfer member in response to movement of said transfer member to said unloading station to move said portion inwardly to a position below said seat.

2. A workpiece transferring device for transferring a workpiece from a loading station to an unloading station, a support, a transfer arm, pivot means pivotally mounting said transfer arm to said support, actuating means operatively connected to said pivot means and said transfer arm for moving said arm between the loading and unloading station, said arm having seat means at the outer end portion thereof for receiving and supporting a workpiece supplied thereto, guide means on said arm for directing the workpiece from the loading station onto said seat means, said arm further having means within the confines of said arm for securely retaining the workpiece to said seat means as said arm is moved from the loading to the unloading station, means connected to said guide means for retracting said guide means from said seat means as said arm is moved from the loading station, and control means operatively connected to said workpiece retaining means to release the workpiece from said arm after said workpiece has been moved to the unloading station.

3. The device defined in claim 2, a vacuum source, a fluid conducting line leading from said vacuum source to said seat means to provide said means for securely retaining the workpiece on said arm, said control means for releasing the workpiece from said arm being formed by valve means connected to said line operative to block said line from the vacuum source and open said line to atmospheric pressure.

4. The device defined in claim 2 and further including a source of electrical energy, said means for securely retaining said workpiece to said arm being an electromagnet, a circuit operatively connecting said source of electrical energy and said electromagnet and wherein said control means to release the workpiece from said arm being a switch in the circuit between said source and said electromagnet.

5. In combination a loading station, an unloading station and a transfer device, said transfer device including a support, a carriage movably mounted on said support, motor means for moving said carriage relative to said support toward and away from said unloading station, a transfer member movably mounted on said carriage, means for moving said transfer member between said loading and unloading station, guide means slidably mounted on said transfer member for guiding an article from said loading station into endwise seating engagement with the end of said transfer member, securing means located entirely within the confines of said transfer member for effecting a secure connection between the article and the end of said transfer member, and link means operatively connecting said guide means and said carriage to retract said guide means on said transfer member as said transfer member is moved from said loading station so that the side surface of the article is fully exposed when moved to the unloading station.

6. In combination, a loading station having a plurality of workpieces thereon, an escapement device forming part of said station for releasing said workpieces one at a time, an unloading station having a workpiece support, a transfer device disposed between said loading and unloading stations, said transfer device including a support, a transfer arm movably mounted on said support, a workpiece guide sleeve extending beyond said member when said member is in a workpiece receiving position, means to move said transfer arm between said loading and unloading stations, means in said transfer arm for securing the workpiece to the outer end of said arm as the workpiece is released by said escapement device into said guide sleeve, means for withdrawing said guide sleeve as said transfer arm is turned toward said unloading station to expose the workpiece on the end of said arm and permit said workpiece to be positioned directly on said workpiece support without interference by said arm.

7. The combination of claim 6 wherein said means for securing the workpiece to the transfer arm includes a passage in said arm leading from the free end thereof, a vacuum source connected to said passage and valve means for blocking said passage from vacuum and opening said passage to atmosphere.

8. The combination defined in claim 6 wherein said means for securing the workpiece to said transfer arm is an electromagnetic located on the end of said transfer arm, means for energizing said device, and switching means operatively connected to said electromagnet for effecting deenergization of device and release of said workpiece when said transfer arm is in the unloading position.

9. The process of transferring an article from a loading station to an unloading station by a pivoted transfer member which comprises constraining said article in the loading station, releasing said article from said loading station, extending guide means from the end of said transfer member, guiding said article by said guide means into endwise seating engagement with the end of said transfer member, releasably securing the article to the outer end of said transfer member, moving said transfer member and thereby conveying said article to the unloading station, retracting said guide means inwardly on said transfer member as said transfer member is moved from said loading station to said unloading station to thereby clear the guide means from said unloading station, releasing said article from said transfer member on said unloading station and moving said transfer member back to said loading station and simultaneously moving said guide means outwardly on said transfer member.

10. The process of claim 9 wherein the step of securing the article to the transfer member includes the establishment of a vacuum between said seated article and said transfer member and the step of releasing said article from said transfer member includes the establishment of a pressure between said seated article and said transfer member.

11. The process of claim 9 wherein the step of securing the article to the transfer member includes the establishment of a magnetic force field between said transfer member and said seated article.

References Cited

UNITED STATES PATENTS

| 2,359,432 | 10/1944 | McNamara | 214—1 |
| 2,540,612 | 2/1951 | Fischer | 214—1 |
| 3,114,464 | 12/1963 | Monnier | 214—1 |

GERALD M. FORLENZA, Primary Examiner

G. F. ABRAHAM, Assistant Examiner

U.S. Cl. X.R.

214—1, 152; 221—293